Sept. 19, 1950      J. A. PIZZO      2,523,055
STRING BEAN GRADER

Filed Oct. 22, 1947      3 Sheets-Sheet 1

INVENTOR,
JOSEPH A. PIZZO
By Dana E. Keech
Attorney

Sept. 19, 1950  J. A. PIZZO  2,523,055
STRING BEAN GRADER
Filed Oct. 22, 1947  3 Sheets-Sheet 2

Inventor
JOSEPH A. PIZZO
By
Dana E. Keech
Attorney

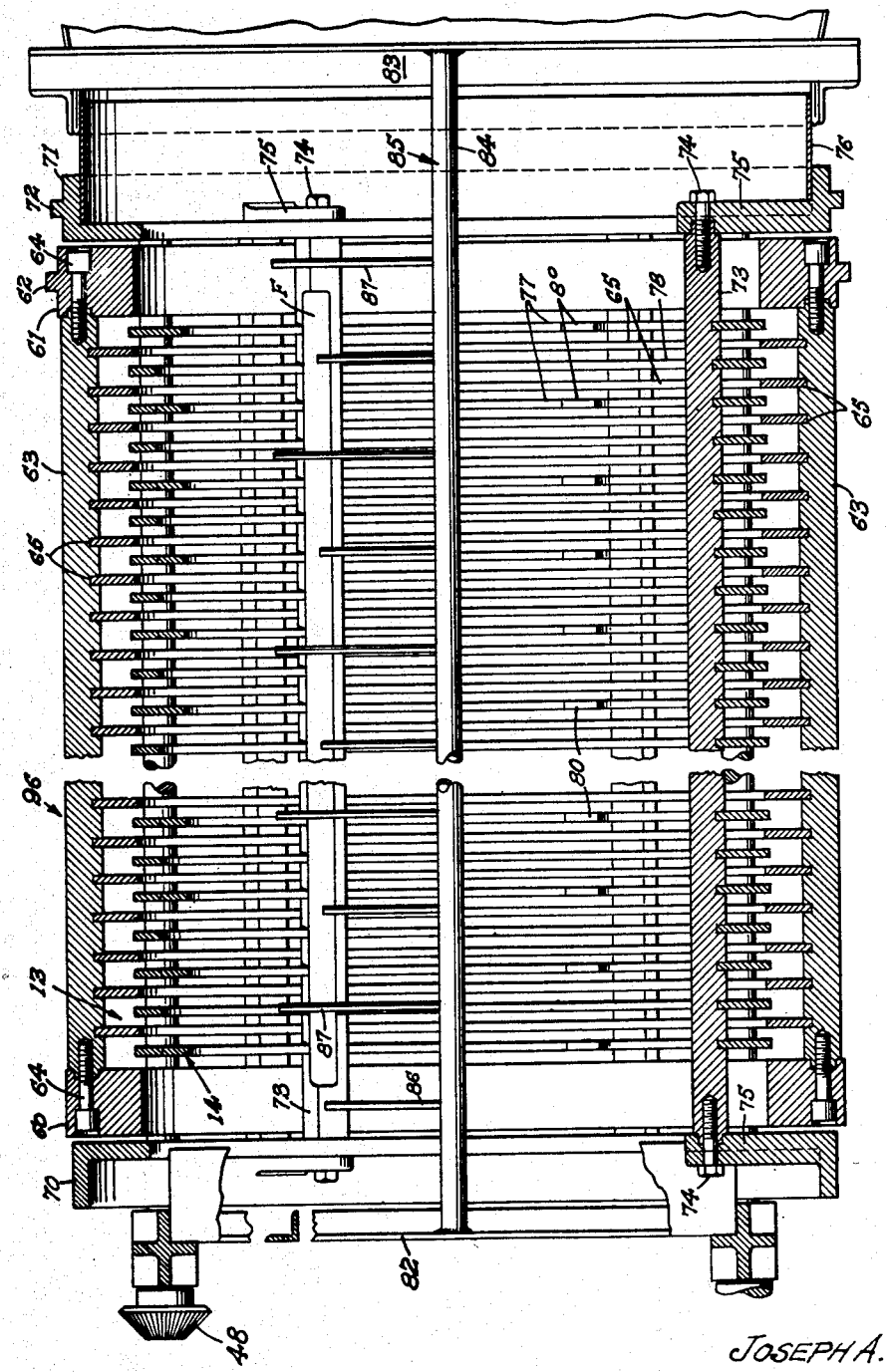

Patented Sept. 19, 1950

2,523,055

UNITED STATES PATENT OFFICE 2,523,055

STRING BEAN GRADER

Joseph A. Pizzo, Portland, Oreg., assignor to Food Machinery and Chemical Corporation, a corporation of Delaware Application October 22, 1947, Serial No. 781,471

7 Claims. (Cl. 209—98)

This invention relates to rotary graders and particularly to string bean graders.

This invention is an improvement in that particular type of string bean grader disclosed in U. S. Letters Patent to Charles E. Kerr, No. 2,416,008, issued February 18, 1947.

It is an object of the present invention to provide a string bean grader of the Kerr type embodying novel means for increasing the capacity of the grader without increasing the size or cost thereof.

The manner of accomplishing the foregoing object as well as further objects and advantages will be made manifest in the following description taken in connection with the accompanying drawings in which:

Fig. 4 is a longitudinal horizontal sectional view taken on the line 4—4 of Fig. 1.

Figure 1:
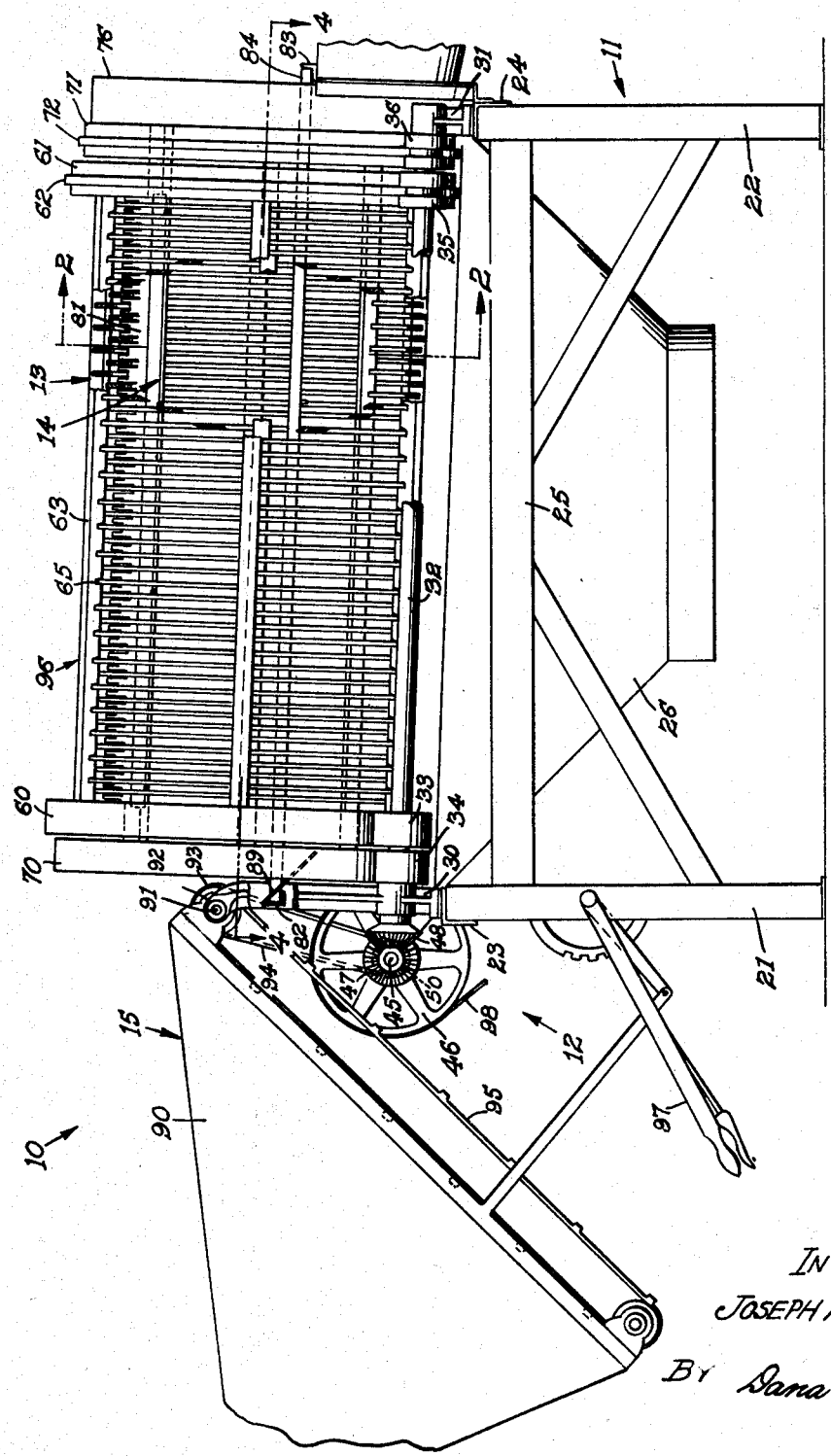
Fig. 1 is a side elevational view of a preferred embodiment of the invention.

Referring specifically to the drawings the invention is there shown as embodied in a grader 10 including a base frame 11, a drive mechanism 12, outer and inner rotary drums 13 and 14 and a feed mechanism 15.

The frame 11 includes legs 21 and 22 united transversely by cross angle beams 23 and 24 and united longitudinally by angle members 25. Mounted on the frame 11 is a bean hopper 26.

The drive mechanism 12 includes bearings 30 and 31 mounted respectively on the beams 23 and 24. Journalled in these bearings are shafts 32. Fixed on the shafts 32 just inside the bearings 31 are smooth faced rollers 33 and 34. Also fixed on these shafts just inside the bearings 31 are rollers 35 and 36 which have annular grooves 37 and 38 formed in their respective faces. The mechanism 12 also includes a drive shaft 45 having a drive pulley 46 and bevelled gears 47 which mesh with bevelled gears 48 provided on adjacent ends of the shafts 32 so that rotation of the shaft 45 turns the shafts 32 in the same direction at the same speed. One end of the shaft 45 is provided with a small sprocket 50 the purpose of which will be made clear hereinafter.

The outer drum 13 of the grader 10 includes a pair of heavy rings 60 and 61 the first of which rests upon the rollers 33, and the second of which rests upon the rollers 35, a flange 62 provided on the ring 61 extending into the annular channels 37 of the rollers 35. The rings 60 and 61 are connected and maintained in spaced concentric relation by six longitudinal bars 63 constituting a ring uniting means for the outer drum 13. The uniting of the bars 63 with the rings 60 and 61 is effected by cap screws 64. Disposed within the area inside the bars 63 is a series of uniform spaced flat rings 65, each of these rings having lugs 66 formed thereon to extend outwardly therefrom, each of these lugs being fixed in a suitable kerf provided in one of the bars 63.

The inner drum 14 includes a smooth faced ring 70 which rests upon the smooth faced rollers 34 and a ring 71 which rests upon the rollers 36 and has a flange 72 which extends into the annular grooves 38 in these rollers. The rings 70 and 71 are connected and maintained in spaced concentric relation by three longitudinal bars 73 constituting a ring uniting means for the inner drum 14, these bars being connected to these rings by cap screws 74, the connection being effected at the inner ends of arms 75 extending inwardly from the rings 70 and 71.

The ring 71 has a sheet metal cuff 76 which forms a discharge mouth for the grader 10.

Figure 2:
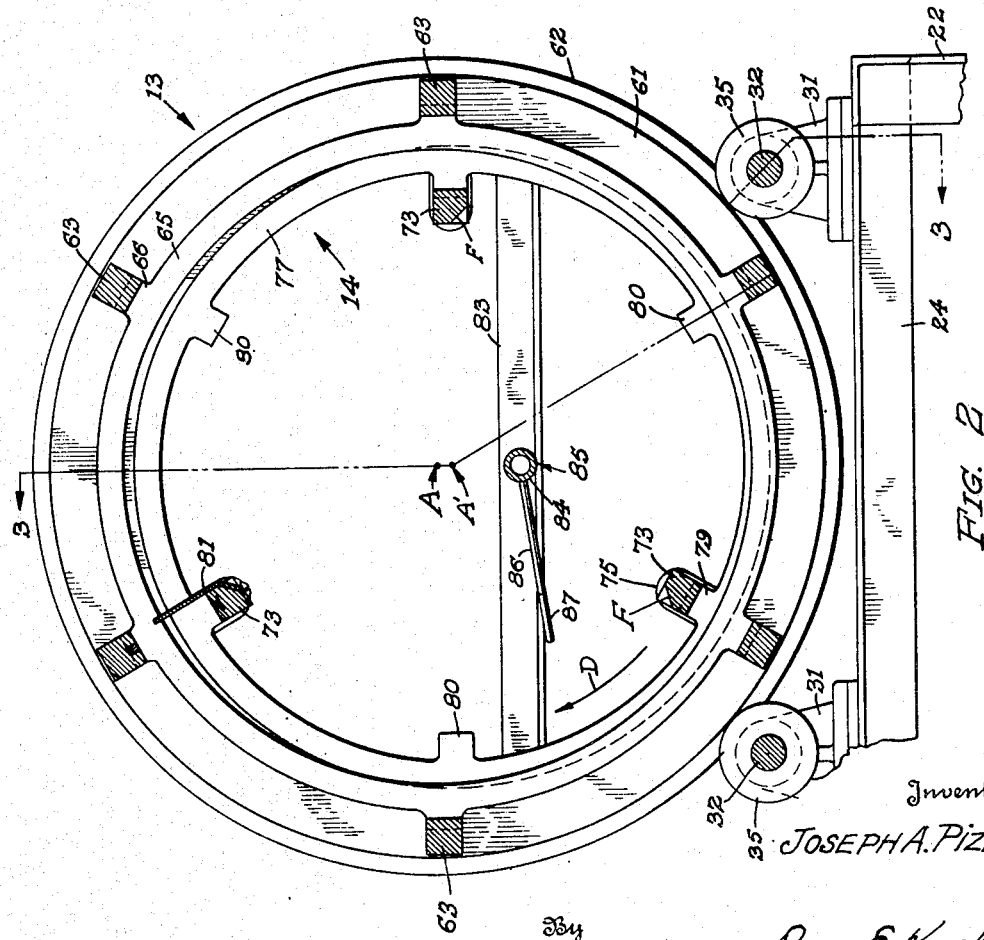
Fig. 2 is an enlarged cross-sectional view taken on the line 2—2 of Fig. 1.

It is to be noted in Fig. 2 that outer drum 13 is formed about the axis A while the inner drum 14 is formed about the axis A'. As viewed in Fig. 2 these drums are adapted to be rotated, as will be made clear hereinafter, in a clock-wise direction as indicated by the arrow D in this view.

It is to be noted that the inner leading edges of the bars 73 are bevelled off so that each of said bars presents a bevelled camming face F to beans engaged thereby.

Disposed outside of the bars 73 so as to encircle these is a series of flat rings 77 and 78 which are of uniform diameter, and which have lugs 79 formed thereon and lying in the planes of the material of the rings themselves so as to extend inwardly into suitable kerfs provided in the bars 73 in which said lugs are fixed. The rings 77 and 78 are so located on the bars 73 as to be interspersed in between and equi-distant longitudinally from adjacent rings 65 of the outer drum 13.

Each of the rings 77 is provided with three bean turning lugs 80, one of which is located equidistant between each adjacent pair of the bars 73, the lugs 80 lying in the respective planes of the rings 77 and extending radially inwardly a short distance therefrom.

Figure 3:
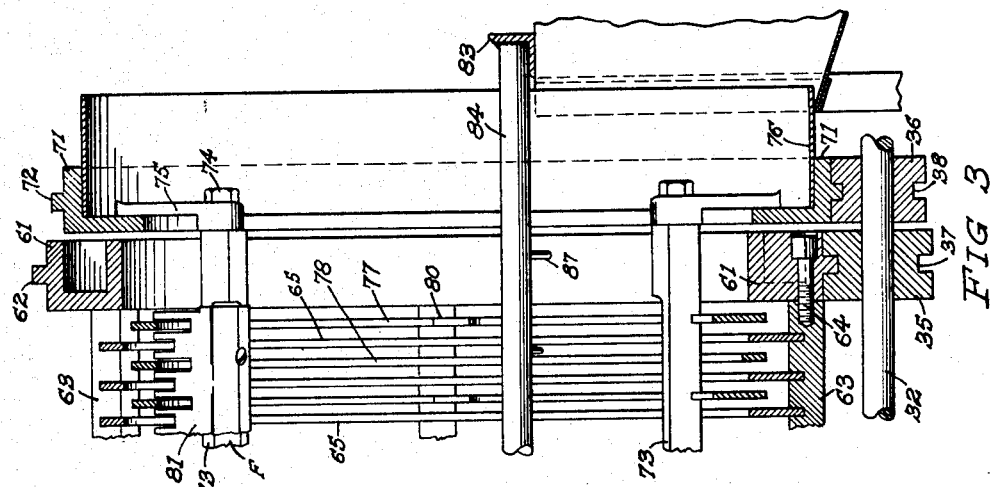
Fig. 3 is a fragmentary vertical sectional view taken on the line 3—3 of Fig. 2.

The rings 78 are identical with the rings 77 excepting that they lack the bean turning lugs 80 and in the preferred embodiment disclosed herein, it is preferable that each adjacent pair of rings 77 be separated by one of the rings 78 (see Figs. 3 and 4). The reason for this spacing longitudinally of the lugs 80 will be made clear hereinafter.

Provided on one of the bars 73 is a sheet metal stripper 81 in the form of a comb which fits into the spaces between the interspersed rings 65, 77 and 78 (see Fig. 3), and the purpose of which will be made clear hereinafter.

The rollers 24 and 36 which support the inner drum 14 are of less diameter than the rollers 33 and 35 which support the outer drum 13.

Likewise the rings 70 and 71 of the inner drum 14 are of slightly less diameter than the rings 60 and 61 of the outer drum 13.

It is this difference in diameter which causes the axis A of the outer drum 13 to be a slight distance above the axis A' of the inner drum 14 as noted.

Fixed at its opposite ends on cross bars 82 and 83 of the frame 11 is the back bar 84 of a bean aligning rake 85. The bar 84 has fixed thereto a series of teeth 86 and 87 which are alternately disposed at equal distances from each other on said back bar, the teeth 87 being somewhat shorter than the teeth 86. As may be seen from Fig. 2, the bar 84 is located just beneath the axis A' and the teeth 86 and 87 thereof slope downwardly from this bar in the general direction of the arrow D toward a position on the inner drum 14 of approximately 8 o'clock. It is to be understood, however, that while this location and posture of the rake 85 is preferable, these may be considerably modified without losing the principal benefit of this rake as will be explained hereinafter.

The feed mechanism 15 includes a receiving drop board 89 mounted on the cross-bar 82 and a hopper 90 which is pivotally supported on a shaft 91 which journals in suitable bearings 92 provided on the frame 11. The shaft 91 has a sprocket 93 which is driven from the shaft 45 by a chain 94 trained about sprockets 50 and 93.

The bottom of the hopper 90 is formed by a slatted conveyor belt 95 which is driven by the shaft 91 to elevate beans out of the hopper 90 and deliver these onto the drop board 89 from which these gravitate to the upper end of the grading cylinder 96 formed by the interlaced drums 13 and 14. The hopper 90 is adapted to be set at various angles about the shaft 91 by a manually operated lever 97. By this means, the speed of feeding of beans from the hopper 90 to the grading cylinder 96 is determined, the less the inclination of the conveyor 95, the faster the rate is at which this feeds beans to the cylinder.

*Operation*

The grader 10 is driven by a belt 98 trained about the pulley 46. Rotation of the shaft 45 drives the slatted belt conveyor 95 and rotates the shafts 32 thereby rotating the drums 13 and 14. Due to the difference in diameters of these drums as well as the difference in diameters of the rollers on which they rest, there is a continuous creeping of one drum relative to the other so that the circumferential relationship of the bars 73 to the bars 63 is constantly changing. Thus the relationship shown in Fig. 2 between these bars is momentary only and the bars 73 constantly progress circumferentially in the direction of the arrow D ahead of the bars 63.

Besides having the advantages of the Kerr grader pointed out in the Kerr patent identified hereinabove, the grader 10 embodies a number of features not found in the Kerr grader but which have proved of material advantage in increasing the volume of beans which will be handled by a grader of a given size.

The first of these features is radically reducing the number of the rings uniting bars of the inner drum 14 to three longitudinal bars 73. This more than doubles the length of the sizing openings formed between overlapping portions of the rings 65 and 77 which are entirely unimpeded by inner drum ring connecting bars. This elimination of all but three of the inner drum ring connecting bars effects a much greater increase in the accessibility of the bars to the sizing openings than is represented by the clearance of the space formerly occupied by the removed bars, that is to say; the interference of the bars removed was discovered after their removal to have been much greater than merely in the areas previously occupied by the removed bars.

It has been found that three bars 73 are quite adequate for the purpose of rigidly uniting the rings 77 and 78 in the inner drum 14.

The reduction in number was also made because the bars 73 tend to turn the beans crosswise when beans slide back thereagainst as these bars are rising to the 8 o'clock position occupied by arrow D in Fig. 2. In the present invention this kind of obstruction is reduced to an absolute minimum and the provision of lugs 80 at intervals throughout the length of the grading cylinder 96 performs the helpful function of combing through the sparse layer of beans resting on the floor of the cylinder 96 as this floor moves upwardly through the 8 o'clock position. This combing tends to swing beans from a longitudinal position where they overlie several of the rings 65 and 77 to a position where they are disposed parallel with the sizing openings, which is to say, in planes perpendicular to the axis A and A'. The longitudinal spacing of the lugs 80 is determined by the length of the beans, this spacing being such as will prevent beans of average length bridging on an adjacent pair of the lugs 80.

As shown in Fig. 3 it has been found preferable to alternate rings 77 and 78 in the inner drum 14 so that throughout the length of the grading cylinder 96, each adjacent pair of the rings 77 for carrying the lugs 80 will have interspersed therebetween, one of the smooth inner drum rings 78 and two of the smooth outer drum rings 65.

As the rings 65, 77 and 78 are but slightly less in thickness than the sizing openings formed between these rings, it is thus seen that the lugs 80 are spaced longitudinally by a slightly less distance than seven times the width of one of the sizing openings.

The rake 85 is provided to supplement the work of the lugs 80 in aligning the beans with the sizing openings. The whole string beans fed to the grading cylinder 96 are carried upwardly by the lugs 80 and the bars 73 until these are no longer supported by these lugs and bars, whereby they drop downwardly to the bottom of the cylinder. The rake 85 is designed to intercept the beans thus falling and it has been found preferable to place this rake as shown and rotate the grading cylinder 96 so that the inner drum will be rotated approximately 227 R. P. M.

When the grader is run at this speed, the beans are carried up by the bars 81 and lugs 80 to approximately a 10 o'clock position from which they drop downwardly in a trajectory inclining towards the axis A' of the inner drum and dropping mainly on the teeth 86 and 87 of the rake 85.

These teeth are preferably 4" and 5½" respectively in length and are spaced apart approximately 3" on centers. This spacing of the teeth 86 and 87 has been found to make these teeth effective in turning beans striking these teeth so as to align the latter with the sizing openings between the rings of the interlaced drums 13 and 14.

While a particular preferred design of the location of the rake 85 is shown in the drawings, it is to be understood that this may be modified to suit various sizes of beans and various rates of feed at various speeds of rotation of the grading cylinder 96. As the speed of rotation increases, the beans fall farther towards the opposite side of the cylinder from that in which they are lifted thus requiring the rake to be placed farther to the right and be provided with longer teeth.

It is also to be understood that the preferred manner of mounting and providing the lugs 80 may be modified under certain circumstances, such for instance as arranging these in stepped or eschelon relation instead of in lines parallel with the axis, as disclosed.

The claims are:

1. In a string bean grader the combination of: an outer set of spaced rings; means disposed outwardly from said rings and uniting said rings to form an outer drum; an inner set of spaced rings lying in planes interspersed alternately between the aforesaid rings of said outer drum; a plurality of bars disposed longitudinally within and adjacent to said inner rings and uniting said rings to form an inner drum separate from said outer drum, said inner drum being smaller in diameter than said outer drum and having its axis disposed below the axis of the outer drum, sizing openings being formed by spaces between overlapping portions of the interlaced rings of said two drums; an aligning rake comprising a back bar and fingers extending therefrom and into the path of beans dropping from the rising side of said inner drum, said fingers being spaced apart sufficiently to prevent the bridging of beans thereon, contact of said fingers with said beans as the latter falls on said fingers thereby tending to align said beans with said sizing openings as said beans drop between said fingers; and means for rotating said drums about their respective axes.

2. A combination as in claim 1 in which alternate fingers of said rake are longer than the fingers interspersed therebetween.

3. A combination as in claim 1 in which the back bar of said rake is disposed below and close to the axis of rotation of said inner drum and in which said fingers all lie substantially in a plane which slopes downwardly away from said back bar towards a rising zone of said inner drum at about 8 o'clock.

4. A combination as in claim 1 in which there are three inner drum ring uniting bars which, at their closest approach to the outer drum ring, are spaced from the inner edges of the outer rings a greater distance than the width of said sizing openings, the latter being continuous throughout the zone where the rings of the two drums overlap; and lugs lying in the planes of and extending inwardly from the inner edges of said inner drum rings, said lugs being substantially equally spaced between the adjacent inner drum ring connecting bars.

5. A combination as in claim 1 in which said inner drum ring connecting bars are not over three in number and in which alternate ones of said inner rings are provided with bean turning lugs lying in the planes thereof and extending inwardly therefrom, said lugs being substantially centrally located in the spaces between adjacent ring connecting bars, the inner edges of the balance of said inner rings being free of said lugs.

6. In a string bean grader the combination of: an outer set of spaced rings; means disposed outwardly from said rings and uniting said rings to form an outer drum; an inner set of spaced rings lying in planes interspersed alternately between the aforesaid rings of said outer drum; a plurality of longitudinal bars disposed inwardly from said inner rings and uniting said inner rings to form an inner drum separate from said outer drum, said inner drum being of smaller diameter than the outer drum and having its axis disposed below the axis of the outer drum, sizing openings being formed by spaces between overlapping portions of the interspersed rings of said two drums, said sizing openings being circumferentially continuous throughout said overlapping portions, the first of said ring uniting means being spaced outwardly from the outer edges of said inner rings and said inner ring uniting bars being spaced inwardly from the inner edges of said outer rings at the points of closest approach, a distance exceeding the width of said sizing openings; a series of bean turning lugs having free inner ends provided on a series of the inner rings between each adjacent pair of said bars at intervals so that between each adjacent longitudinally spaced pair of said lugs, at least one inner ring clear of said lugs are interspersed between said adjacent pair of lugs, the spaces between corresponding lugs on adjacent rings of said series being unobstructed; and means for rotating said drums about their respective axes.

7. In a string bean grader the combination of: an outer set of spaced rings; means disposed outwardly from said rings and uniting said rings to form an outer drum; an inner set of spaced rings lying in planes interspersed alternately between the aforesaid rings of said outer drum; a plurality of longitudinal bars disposed inwardly from said inner rings and uniting said inner rings to form an inner drum separate from said outer drum, said inner drum being of smaller diameter than the outer drum and having its axis disposed below the axis of the outer drum, sizing openings being formed by spaces between overlapping portions of the interspersed rings of said two drums, said sizing openings being circumferentially continuous throughout said overlapping portions; a series of bean turning lugs having free inner ends, said series of lugs being provided respectively on a series of the aforesaid inner rings in the space between said bars, each of said lugs lying substantially in the radial plane of the ring on which it is provided, inner edges of the inner rings next adjacent to a ring having such a lug being concentric and bare of such lugs in those portions of said edges which are located on opposite sides of said lug and in the close vicinity thereof, the sizing openings on said opposite sides of said lugs being free of obstruction to permit beans aligned with said sizing openings by said lug to fall through said sizing openings if said beans are of smaller diameter than the width of said openings; and means for rotating said drums.

JOSEPH A. PIZZO.

REFERENCES CITED

The following references are of record in the file of this patent:

UNITED STATES PATENTS

| Number | Name | Date |
|---|---|---|
| 855,981 | Rich | June 4, 1907 |
| 2,241,977 | Buck | May 13, 1941 |
| 2,416,008 | Kerr | Feb. 18, 1947 |

Certificate of Correction

Patent No. 2,523,055                                          September 19, 1950

JOSEPH A. PIZZO

It is hereby certified that error appears in the printed specification of the above numbered patent requiring correction as follows:

Column 5, line 75, for the word "ring" read *rings*; column 7, line 2, for "lugs" read *lug*;

and that the said Letters Patent should be read as corrected above, so that the same may conform to the record of the case in the Patent Office.

Signed and sealed this 20th day of March, A. D. 1951.

[SEAL]

THOMAS F. MURPHY,
*Assistant Commissioner of Patents.*